(12) United States Patent
Sugawara

(10) Patent No.: US 7,579,404 B2
(45) Date of Patent: Aug. 25, 2009

(54) POLYMERIZABLE COMPOSITION AND MOLDED PRODUCT THEREOF

(75) Inventor: Tomoo Sugawara, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/567,257

(22) PCT Filed: Aug. 9, 2004

(86) PCT No.: PCT/JP2004/011716

§ 371 (c)(1),
(2), (4) Date: Feb. 6, 2006

(87) PCT Pub. No.: WO2005/014690

PCT Pub. Date: Feb. 17, 2005

(65) Prior Publication Data

US 2006/0293444 A1 Dec. 28, 2006

(30) Foreign Application Priority Data

Aug. 7, 2003 (JP) ............................. 2003-289355

(51) Int. Cl.
*C08L 45/00* (2006.01)
*C08K 5/49* (2006.01)
*C08F 2/44* (2006.01)

(52) U.S. Cl. .................. 524/855; 524/706; 524/786; 524/849; 524/856; 252/182.18

(58) Field of Classification Search ................. 524/549, 524/553, 554, 706, 786, 849, 855, 856; 252/182.18
See application file for complete search history.

(56) References Cited

U.S. PATENT DOCUMENTS 4,059,561 A * 11/1977 Arai et al. ..................... 524/82

| | | | |
|---|---|---|---|
| 2004/0047056 A1 | 3/2004 | Sekiguchi et al. | |
| 2004/0057141 A1 | 3/2004 | Sekiguchi et al. | |

FOREIGN PATENT DOCUMENTS

| EP | 0 283 719 A2 | 9/1988 |
|---|---|---|
| EP | 1 535 941 A1 | 6/2005 |
| GB | 1 533 124 A | 11/1978 |
| JP | 7-227863 A | 8/1995 |
| JP | 9-221551 A | 8/1997 |
| JP | 10-120768 A | 5/1998 |
| JP | 10 168228 A | 6/1998 |
| JP | 2001-64489 A | 3/2001 |
| JP | 2001-234039 A | 8/2001 |
| JP | 2003-238705 A | 8/2003 |
| WO | WO-98/05715 A1 | 2/1998 |
| WO | WO-2004/003052 A1 | 1/2004 |

OTHER PUBLICATIONS

Brennan et al, "The Copper-Catalyzed Reaction of Benzorbornadiene with Benzoyl Peroxide and t-Butyl Perbenzoate . . . ", The Journal of Organic Chemistry, vol. 33, No. 1, 324-332 (1968).*

* cited by examiner

*Primary Examiner*—Fred M Teskin
(74) *Attorney, Agent, or Firm*—Birch, Stewart, Kolasch & Birch, LLP

(57) ABSTRACT

Disclosed are a cycloolefin resin molded product having excellent flame retardance and a polymerizable composition used for producing such a molded-product. A polymerizable composition comprising the cycloolefin monomer, a flame retardant and a metathesis polymerization catalyst is characterized in that a monomer having a condensed ring formed of an aliphatic ring having one or more carbon-carbon double bonds and a ring with aromatic characteristics is used as the cycloolefin monomer. A molded product can be produced through bulk polymerization of this polymerizable composition.

6 Claims, No Drawings

POLYMERIZABLE COMPOSITION AND MOLDED PRODUCT THEREOF

TECHNICAL FIELD

The present invention relates to a molded product having excellent flame retardance and made of a cycloolefin resin, and to a polymerizable composition used for producing the molded product.

BACKGROUND ART

Since a cycloolefin resin obtained by bulk polymerization of a polymerizable composition containing a cycloolefin monomer is excellent in mechanical characteristics, impact resistance, weather resistance and the like, a molded product obtained by the cycloolefin resin has been put to practical use in a wide range of fields. Since such cycloolefin resin itself is inflammable and flame retardance is required in some purpose of use of the molded product, addition of a flame retardant into a polymerizable composition has been proposed in recent years.

Conventionally, a halogen-containing flame retardant having a halogen atom therein has been used as the flame retardant (Japanese Patent Application Laid-Open (JP-A) No. 7-227863 or the like).

When the halogen-containing flame retardant is used, the flame retarding effect can be obtained even in a comparative small amount of addition. However, since a toxic gas is generated when waste molded product is combusted, further reduction of the amount of the addition thereof and conversion to a halogen-free flame retardant have been required.

In response to such requirements, a flame retarding technology using the halogen-free flame retardant has been reported. For Example, in JP-A No. 9-221551, disclosed is a flame retardant glass fiber reinforced polynorbornene resin molded product (cycloolefin resin molded product) obtained by bulk polymerization of a norbornene monomer in the presence of long glass fibers and red phosphorus.

Moreover, in JP-A No. 2001-234039, disclosed is a molded product (cycloolefin resin molded product) made of a polynorbornene resin containing at least one flame retardant selected from: a combination flame retardant of a phosphorus atom-containing flame retardant and a nitrogen atom-containing flame retardant; and a flame retardant having a phosphorus atom and a nitrogen atom in a molecule.

Besides, in JP-A No. 2001-64489, disclosed is a flame retardant resin composition made of (a) a metathesis polymerizable cycloolefin compound, (b) a compound insoluble in the compound described in (a), not having a halogen atom, and releasing an inert gas when being heated, and (c) a metathesis polymerization catalyst.

However, in many cases, the halogen-free flame retardant should be added in a large amount thereof to obtain the flame retarding effect, wherefore it causes reduction in mechanical properties of the molded product.

DISCLOSURE OF INVENTION

In light of the conventional technology, the present inventor has conducted extensive studies in order to obtain a cycloolefin resin molded product excellent in flame retardance. As a result, the present inventor has found that a resin molded product improved in flame retardance can be obtained by using a specific cycloolefin monomer, which has led to completion of the present invention.

According to the present invention, firstly there is provided a polymerizable composition comprising a cycloolefin monomer, a flame retardant and a metathesis polymerization catalyst, wherein a monomer having a condensed ring made of an aliphatic ring having one or more carbon-carbon double bonds and an aromatic ring is used as the cycloolefin monomer.

Secondly there is provided a resin molded product obtained by at least bulk polymerizing the polymerizable composition.

According to the present invention, a resin molded product having a flame retardance equal to a conventional one even if the amount of the flame retardant added is reduced can be obtained. Therefore, a resin molded product of the present invention can decrease the amount of the toxic gas originating from the flame retardant on combusting the molded product, and suppress the reduction in mechanical property.

BEST MODE FOR CARRYING OUT THE INVENTION

[Polymerizable Composition]

A polymerizable composition of this invention contains a cycloolefin monomer, a flame retardant and a metathesis catalyst. In this invention, as the cycloolefin monomer, one or more kinds of monomers each having a condensed ring made of an aliphatic ring having one or more carbon-carbon double bonds and an aromatic ring is used (hereinafter referred to as "aromatically condensed ring-containing cycloolefin monomer").

The components of the polymerizable composition are explained below.

(Aromatically Condensed Ring-Containing Cycloolefin Monomer)

The aromatically condensed ring-containing cycloolefin monomer is a monomer having a condensed ring made of an aliphatic ring having one or more carbon-carbon double bonds (that is an unsaturated aliphatic ring) and an aromatic ring. Herein, the "condensed ring" means a ring obtained by ortho condensation or ortho-peri condensation of an unsaturated aliphatic ring and an aromatic ring, and thus both two rings share two atoms and one bond.

The aromatically condensed ring-containing cycloolefin monomer may be substituted therein with a hydrocarbon group such as an alkyl group, an alkenyl group, an alkylidene group and an aryl group, or a polar group. The unsaturated aliphatic ring includes a monocylic ring, a bicyclic ring, a tricyclic ring and a polycyclic ring having four or more rings in molecule. The aromatic ring may be a carbon-condensed ring or a hetero-condensed ring and be a monocyclic ring or a polycyclic ring. Examples of the aromatic ring include carbon-condensed rings such as a benzene ring, a naphthalene ring, an anthracene ring, and a phenanthrene ring; and hetero-condensed rings such as a pyridine ring, a pyrimidine ring, a furan ring, a thiophene ring, an imidazole ring, a pyrrole ring, an oxazole ring, a pyrazine ring and a benzoimidazole ring. Among them, preferable are hydrocarbon aromatic rings such as a benzene ring and a naphthalene ring and a furan ring in that no hindrance occurs to metathesis polymerization reaction.

Examples of the aromatically condensed ring-containing cycloolefin monomer having one unsaturated aliphatic ring include bicyclo[4.2.0]octa-1,3,5,7-teraene, bicyclo[4.4.0] deca-1,3,5,8-teraene, bicyclo[6.4.0]dodeca-1(8),4,9,11-teraene and the like.

Examples of the aromatically condensed ring-containing cycloolefin monomer having two unsaturated aliphatic rings include tricyclo[6.2.1.0$^{2,7}$]undeca-2,4,6,9-tetraene, tetracyclo[6.6.2.0$^{2,7}$.0$^{9,14}$]hexadeca-2,4,6,9(10),11,13,15-heptaene, tetracyclo [10.2.1.0$^{2,11}$.0$^{4,9}$]pentadeca-2,4,6,8,10,13-hexaene and the like.

Examples of the aromatically condensed ring-containing cycloolefin monomer having three unsaturated aliphatic rings include tetracyclo[9.2.1.0$^{2,10}$.0$^{3,8}$]tetradeca-3,5,7,12-tetraene (also referred to as 1,4-methano-1,4,4a,9a-tetrahydro-9H-fluorene) , tetracyclo [10.2.1.0$^{2,11}$.0$^{4,9}$]pentadeca-4,6,8,13-tetraene (also referred to as 1,4-methano-1,4,4a,9,9a,10-hexahydroanthracene), tetracyclo[10.2.1.0$^{2,11}$.0$^{3,8}$]oentaceca-3,5,7,11,13-tetraene, cyclopentadiene-acenaphthylene adduct, pentacyclo [13.2.1.0$^{2,14}$.0$^{3,12}$.0$^{5,10}$] octadeca-3,5,7,9,11,16-hexaene, pentacyclo[13.2.1.0$^{2,14}$.0$^{3,12}$.0$^{4,9}$]octadeca-3,5,7,9,11,16-hexaene, pentacyclo [13.2.1.0$^{2,14}$.0$^{3,12}$.0$^{6,11}$]octadeca-3,5,7,9,11,16-hexaene and the like.

Examples of the automatically condensed ring-containing cycloolefin monomers having four or more unsaturated aliphatic rings include hexacyclo[13.2.1.0$^{3,13}$.0$^{2,14}$.0$^{4,12}$.0$^{5,10}$]nonadeca-5,7,9,16-tetraene, octacyclo [17.2.1.1$^{3,17}$.1$^{5,15}$.0$^{2,18}$.0$^{4,16}$.0$^{5,14}$.0$^{7,12}$]tetraeicosa-7,9,11,20-tetraene; and the like.

Among them, preferable are the aromatically condensed ring-containing cycloolefin monomer having three unsaturated aliphatic rings and more preferable is tetracyclo[9.2.1.0$^{2,10}$.0$^{3,8}$]tetradeca-3,5,7,12-tetraene in consideration of a balance between flame retardance and polymer properties.

The ratio of the aromatically condensed ring-containing cycloolefin monomer to all the amount of the cycloolefin monomers is not particularly limited, but is preferably in the range of 10 to 95 weight % and more preferably 20 to 90 weight % in consideration of a balance between flame retardance and mechanical properties of the molded product.

In this invention, a cycloolefin monomer not having the condensed ring structure with the aromatic ring (hereinafter referred to as an "other cycloolefin monomer") can be used together with the aromatically condensed ring-containing cycloolefin monomer described above.

(Other Cycloolefin Monomer)

Examples of the other cycloolefin monomer include a monocycloolefin monomer, a norbornene monomer (dicyclopentadienes, tetracyclododecenes, and norbornenes) and the like. The other cycloolefin monomer may also be substituted therein with a hydrocarbon group such as an alkyl group an alkenyl group, an alkylidene group and an aryl group, or a polar group. Besides, the other cycloolefins may have another double bond therein in addition to the double bond in the norbornene ring.

Examples of the monocycloolefin monomer include cyclobutene, cyclopentene, cyclooctene, cyclododecene, 1,5-cyclooctadiene and the like.

Specific examples of the norbornene monomer include dicyclopentadienes such as dicyclopentadiene, methyldicyclopentadiene;

tetracyclododecenes such as tetracyclo[6.2.1.1$^{3,6}$.0$^{2,7}$]dodec-4-ene, 9-ethylidenetetracyclo[6.2.1.1$^{3,6}$.0$^{2,7}$]dodec-4-ene, 9-vinyltetracyclo[6.2.1.1$^{3,6}$.0$^{2,7}$]dodec-4-ene, 9-phenyltetracyclo[6.2.1.1$^{3,6}$.0$^{2,7}$]dodec-4-ene, tetracyclo[6.2.1.1$^{3,6}$.0$^{2,7}$]dodec-9-ene-4-carboxylic acid, tetracyclo[6.2.1.1$^{3,6}$.0$^{2,7}$]dodec-9-ene-4,5-dicarboxylic anhydride;

norbornenes such as 2-norbornene, 5-ethylidene-2-norbornene, 5-vinyl-2-norbornene, 5-phenyl-2-norbornene, acrylic acid 5-norbornen-2-yl, methacrylic acid 5-norbornen-2-yl, 5-norobonene-2-carboxylic acid, 5-norbornene-2,3-dicarboxylic acid, 5-norbornene-2,3-dicarboxylic anhydride;

oxanorbornenes such as 7-oxa-2-norbornene, 5-ethylidene-7-oxa-2-norbornene; and cycloolefins each having 5 or more rings in molecule such as pentacyclo[6.5.11$^{3,6}$.0$^{2,7}$.0$^{9,13}$]pentadeca-4,10-diene, pentacyclo[9.2.1.1$^{4,7}$.0$^{2,10}$.0$^{3,8}$]pentadeca-5,12-diene.

These norbornene monomers can be used as one kind alone, but a norbornene monomer mixture obtained by mixing two or more kinds together can also be used. By using two or more kinds of them together and varying the ratio, it is possible to control freely a glass transition temperature and a melting point of a thermoplastic resin obtained.

(Flame Retardant)

The flame retardant used in this invention may be a halogen-containing flame retardant, a halogen-free flame retardant or a mixture thereof.

Examples of the halogen-containing flame retardant include; low molecular, halogen-containing organic compounds such as hexabromobenzene, decabromodiphenyl oxide, bis(tribromophenoxy)ethane, 1,2-bis(pentabromophenyl)ethane, tetrabromobisphenol S, tetradecabromo-diphenoxybenzene, 2,2-bis(4-hydroxy-3,5-dibromophenyl-propane), pentabromotoluene, tris(2-chloroethyl)phosphate, tris(chloropropyl)phosphate, tris(dichloropropyl)phosphate, tris(tribromoneopentyl)phosphate, and halogen-containing condensed phosphoric acid ester; and high molecular halogen-containing organic compounds such as halogenated paraffins having a halogen content in the range of 40 to 70 weight %, halogenated elastomers, halogenated polystyrenes such as chlorinated polystyrene and iodinated polystyrene, halogenated polyolefins such as highly chlorinated polyethylene with a halogen content of 50 weight % or more, highly chlorinated polypropylene with a halogen content of 50 weight % or more, and chlorosulfonated polyethylene with a halogen content of 50 weight % or more, and halogenated polyvinyl chlorides such as chlorinated polyvinyl chloride.

Examples of the halogen-free flame retardant used in this invention include an antimony-containing flame retardant, a metal hydroxide flame retardant, phosphorus-containing flame retardant, a nitrogen-containing flame retardant, a flame retardant containing both phosphorus and nitrogen.

Examples of the antimony-containing flame retardant include antimony trioxide, antimony pentaoxide, sodium antimonate and the like.

Examples of the metal hydroxide flame retardant include aluminum hydroxide, magnesium hydroxide and the like. These flame retardants may be used after a surface treatment with a silane coupling agent, a titanate coupling agent, an aluminate coupling agent, or fatty acid (stearic acid and the like).

Examples of the phosphorus-containing flame retardant include red phosphorus, a phosphoric acid ester and the like. Red phosphorus may be used in the form of encapsulation or after a surface treatment with a silane coupling agent. Examples of the phosphoric acid esters include triphenyl phosphate, tricresyl phosphate, trixylenyl phosphate, cresyldiphenyl phosphate, resorcinolbis(diphenyl)phosphate, bisphenol A bis(diphenyl)phosphate, bisphenol A bis(dicresyl)phosphate and the like. Among them, preferable are tertiary phosphoric acid esters with a comparative large molecular weight such as tricresyl phosphate, resorcinolbis (diphenyl)phosphate, bisphenol A bis(diphenyl)phosphate and bisphenol A bis(dicresyl)phosphate.

Examples of the nitrogen-containing flame retardant include melamine derivatives, guanidines, isocyanuric acid and the like, and preferable are melamine derivatives. Examples of melamine derivatives include melamine, melamine resin, melam, melem, melamine cyanurate, succinoguanamine, ethylene dimelamine, triguanamine, melamine sulfate, guanylmelamine sulfate, melamsulfate, melemsulfate and the like, and preferable is melamine sulfate. Examples of guanidines include guanidine nitrate, guanidine carbonate, guanidine sulfamate, aminoguanidine nitrate, aminoguanidine bicarbonate and the like, and preferable is guanidine nitrate.

Examples of the flame retardant containing both phosphorus and nitrogen include ammonium polyphosphate, melamine phosphate, melamine polyphosphate, melam polyphosphate, guanidine phosphate, phosphazenes and the like,.and preferable are ammonium polyphosphate, melamine polyphosphate and melam polyphosphate. These flame retardants can be used alone or in combination of two or more kinds. Examples of the phosphazenes that can be used in this invention include propoxyphosphazene, phenoxyphosphazene, aminophosphazene, dipropoxyphosphazene, polyphosphazene and the like.

Examples of other halogen-free flame retardants include silicon powder, fumed silica, zinc stannate, zinchydroxystannate, zinc borate, HALS and the like.

The above flame retardants can be used alone or in combination of several kinds. By using the flame retardants in combination of several kinds, synergetic effect can be obtained in many cases.

Of the above flame retardants, the halogen-free flame retardant can be preferably used in that no halogen containing-toxic gas is generated during combustion. Further, it is preferable to use only the halogen-free flame retardant from the viewpoint of environmental safety.

The amount of the flame retardant added is preferably in the range of 10 to 1000 parts by weight and more preferably 20 to 500 parts by weight relative to 100 parts by weight of all cycloolefin monomers. When the amount thereof is in the above range, a good balance between flame retardance and moldability can be obtained, which is preferable. When the phosphorus-free flame retardant is used, however, it is desirable to increase the amount of the flame retardant comparatively to obtain a sufficient flame retarding effect (for example, 80 parts by weight or more relative to 100 parts by weight of all cycloolefin monomers)

(Metathesis Polymerization Catalyst)

The metathesis polymerization catalyst used in this invention is not particularly limited insofar as it enables the ring-opening metathesis polymerization of the cycloolefin monomer.

An example of the metathesis polymerization catalyst includes a complex having a transition metal atom as a central atom to which a plurality of ions, atoms, multi-atom ions and/or compounds are bonded. Examples of the transition metal atoms Include: atoms of groups 5, 6 and 8 of a periodic table (long periodic-type, which also applies in later description). The atom in respective groups is not particularly limited, and the examples thereof are tantalum in Group 5, molybdenum or tungsten in Group 6 and ruthenium or osmium in Group 8.

Among them, preferable is the complex of ruthenium or osmium in group 8 to be used as the metathesis polymerization catalyst and more preferable is a ruthenium carbene complex. The ruthenium carbene complex is excellent in catalytic activity for bulk polymerization, and is thus excellent in productivity of a post-crosslinkable thermoplastic resin. Besides, the thermoplastic resin obtained is less smelly (originating from unreacted cycloolefin) and the productivity thereof is excellent. Further, the ruthenium carbene complex is relatively stable to oxygen and water in air and hardly inactivated, to make its production of the thermoplastic resin under the atmospheric conditions.

The ruthenium carbene complex is a complex compound represented by the following formula (1) or (2):

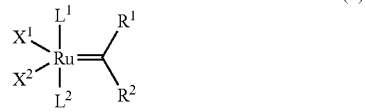

(1)

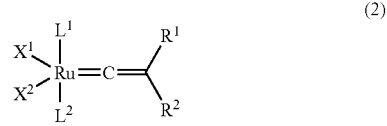

(2)

In the formulae (1) and (2), $R^1$ and $R^2$ may be the same or different, and each represents a hydrogen atom, a halogen atom, or a hydrocarbon group having 1 to 20 carbon atoms optionally containing a halogen atom, an oxygen atom, a nitrogen atom, a sulfur atom, a phosphorus atom or a silicon atom. $X^1$ and $X^2$ may be the same or different, and each represents an arbitrary anionic ligand. $L^1$ and $L^2$ may be the same or different, and each represents a heteroatom-containing carbene compound or a neutral electron-donating compound. $R^1$, $R^2$, $X^1$, $X^2$, $L^1$ and $L^2$ may be bonded to one another in an arbitrary combination to form a multidentate chelate ligand.

The hetero atom means an atom in groups 15 or 16 of the periodic table, examples of hetero atoms include N, O, P, S, As and Se atoms. Among these atoms, N, O, P, and S atoms are preferable from the viewpoint of the ability to produce a stable carbene compound, and an N atom is particularly preferable.

The heteroatom-containing carbene compound preferably has heteroatoms bonded to, and adjacent to, both sides of a carbene atom, and more preferably has a heterocycle constituted by containing a carbene carbon atom and heteroatoms in both sides of the carbene carbon atom. Preferably, the heteroatoms adjacent to the carbene carbon atom have a bulky substituent group.

Examples of the heteroatom-containing carbene compound include compounds represented by the following formulae (3) or (4):

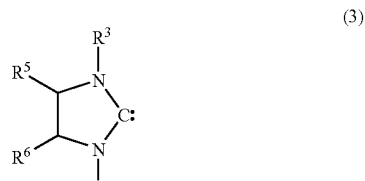

(3)

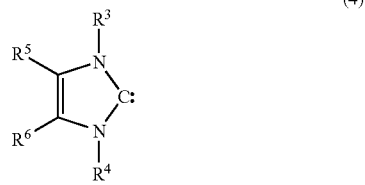

(4)

wherein $R^3$ to $R^6$ may be the same or different, and each represent a hydrogen atom, a halogen atom, or a hydrocarbon group having 1 to 20 carbon atoms optionally containing a halogen atom, an oxygen atom, a nitrogen atom, a sulfur atom, a phosphorus atom or a silicon atom, and $R^3$ to $R^6$ may be bonded to each other in an arbitrary combination to form a ring.

Specific examples of the compounds represented by the formulae (3) and (4) above include 1,3-dimesitylimidazolidin-2-ylidene, 1,3-dimesityl-4-imidazolin-2-ylidene, 1,3-di(1-phenylethyl)-4-imidazolin-2-ylidene, and 1,3-dimethyl-2,3-dihydrobenzimidazol-2-ylidene.

In addition to the compounds represented by the formulae (3) and (4) above, it is also possible to employ, as the heteroatom-containing carbene compound, 1,3,4-triphenyl-2,3,4,5-tetrahydro-1H-1,2,4-triazol-5-ylide ne, 1,3,4-triphenyl-4,5-dihydro-1H-1,2,4-triazol-5-ylidene and the like.

In the formulae (1) and (2), each of the anionic (negative ionic) ligands $X^1$ and $X^2$ is a ligand to be negatively charged upon removal from the central metal, and examples thereof include halogen atoms such as F, Cl, Br and I, a diketonate group, substituted cyclopentadienyl group, alkoxyl group, aryloxy group and carboxyl group. Among these groups, a halogen atom is preferable, and a chlorine atom is more preferable.

The neutral electron-donating compound may be any ligand to have neutral charge upon removal from the central metal. Specific examples thereof include carbonyls, amines, pyridines, ethers, nitriles, esters, phosphines, thioethers, aromatic compounds, olefins, isocyanides, and thiocyanates. Among these compounds, phosphines, ethers and pyridines are preferable, and trialkyl phosphine is more preferable.

Examples of the complex compound represented by the formula (1) above includes ruthenium complex compounds wherein $L^1$ and $L^2$ are the heteroatom-containing carbene compound and the neutral electron-donating compound respectively such as benzylidene (1,3-dimesitylimidazolidin-2-ylidene)(tricyciohexyl phosphine)ruthenium dichloride, (1,3-dimesitylimidazolidin-2-ylidene)(3-methyl-2-buten-1-ylidene)(tricyclopentyl phosphine)ruthenium dichloride, and benzylidene (1,3-dimesityl-2,3-dihydrobenzimidazol-2-ylidene) (tricyclohexyl phosphine)ruthenium dichloride;

ruthenium complex compounds wherein $L^1$ and $L^2$ are both neutral electron-donating compounds such as benzylidenebis (tricyclohexyl phosphine)ruthenium dichloride and (3-methyl-2-buten-1-ylidene)bis(tricyclopentyl phosphine)ruthenium dichloride; and ruthenium complex compounds wherein $L^1$ and $L^2$ are both heteroatom-containing carbene compounds such as benzylidenebis(1,3-dicyclohexylimidazolidin-2-ylidene)ruthenium dichloride and benzylidenebis(1,3-diisopropyl-4-imidazolin-2-ylidene)ruthenium dichloride.

These ruthenium complex catalysts can be produced by methods described in, for example, Organic Lett., vol. 1, p. 953 (1999) and Tetrahedron Lett., vol. 40, p. 2247 (1999).

The amount of the metathesis polymerization catalyst, in terms of the molar ratio of (metal atom in the catalyst:cycloolefin monomer), is usually in the range of 1:2,000 to 1:2,000,000, preferably 1:5,000 to 1:1,000,000, more preferably 1:10,000 to 1:500,000.

The ruthenium catalyst can be used if necessary in the form of a solution in a small amount of an inert solvent. Examples of the solvent include acyclic aliphatic hydrocarbons such as n-pentane, n-hexane and n-heptane, liquid paraffin, and mineral spirit; alicyclic hydrocarbons such as cyclopentane, cyclohexane, methyl cyclohexane, dimethyl cyclohexane, trimethyl cyclchexane, ethyl cyclohexane, diethyl cyclohexane, decahydronaphthalene, dicycloheptane, tricyclodecane, hexahydroindene and cyclooctane; aromatic hydrocarbons such as benzene, toluene and xylene; nitrogen-containing hydrocarbons such as nitromethane, nitrobenzene and acetonitrile; and oxygen-containing hydrocarbons such as diethyl ether and tetrahydrofuran. Preferable among these solvents are industrially widely usable aromatic hydrocarbons, acyclic aliphatic hydrocarbons and alicyclic hydrocarbons. Further, a liquid antioxidant, a liquid plasticizer and a liquid elastomer may be used as the solvent insofar as it does not lower the catalytic activity of the metathesis polymerization catalyst.

(Chain Transfer Agents)

The polymerizable composition of this invention may contain a chain transfer agent. By using the polymerizable composition containing the chain transfer agent, a thermoplastic resin can be obtained. The thermoplastic resin is crosslinkable at the same time as heating and melting the resin when a crosslinking agent described later is used.

As the chain transfer agent, for example, a compound having a carbon-carbon double bond can be used. Specific examples thereof include aliphatic olefins such as 1-hexene and 2-hexene; aromatic olefins such as styrene, divinylbenzene and stilbene; alicyclic olefins such as vinylcyclohexane; vinyl ethers such as ethyl vinyl ether; vinyl ketones such as methyl vinyl ketone, 1,5-hexadien-3-one and 2-methyl-1,5-hexadien-3-one; and a compound represented by a formula $CH_2$=CH-Q (in the formula, Q is a group having at least one selected from the group consisting of a methacryloyl group, an acryloyl group, a vinylsilyl group, an epoxy group and an amino group). Among these compounds, the compound represented by the formula $CH_2$=CH-Q is preferably used since Q is introduced, when the compound is used, to terminal of the polymer and is contributed to the crosslinking during post-crosslinking reaction, thereby increasing the crosslinking density thereof.

Specific examples of the compounds represented by the formula $CH_2$=CH-Q include: compounds wherein Q is a group having a methacryloyl group such as vinyl methacrylate, allyl methacrylate, 3-buten-1-yl methacrylate, 3-buten-2-yl methacrylate and styryl methacrylate; compounds wherein Q is a group having an acryloyl group such as allyl acrylate, 3-buten-1-yl acrylate, 3-buten-2-yl acrylate, 1-methyl-3-buten-2-yl acrylate, styryl acrylate and ethylene glycol diacrylate; compounds wherein Q is a group having vinylsilyl group such as allyl trivinyl silane, allyl methyl divinyl silane and allyl dimethyl vinyl silane; compounds wherein Q is a group having an epoxy group such as glycidyl acrylate and allyl glycidyl ether; and compounds wherein Q is a group having an amino group such as allylamine, 2-(diethylamino) ethanol vinyl ether, 2-(diethylamino)ethyl acrylate and 4-vinylaniline.

The amount of the chain transfer agent used is usually in the range of 0.01 to 10 parts by weigh; and preferably 0.1 to 5 parts by weight relative to 100 parts by weight of all cycloolefin monomers. When the amount of the chain transfer agent is in the above range, the polymerization reaction conversion is high and a post-crosslinkable thermoplastic resin molded product can be obtained efficiently. When the amount of the chain transfer agent is too small, the thermoplastic resin may not be obtained. To the contrary, when the amount of the chain transfer agent is too large, it may be difficult to crosslink the thermoplastic resin.

(Crosslinking Agent)

In this invention, the polymerizable composition may further contain a crosslinking agent as a component thereof. The crosslinking agent is a compound used for producing a crosslinked resin by causing crosslinking reaction with a carbon-carbon double bond in the resin molded product obtained by polymerization of the polymerizable composition.

As the crosslinking agent, a radical generating agent can be used and includes, for example, an organic peroxide and a diazo compound. Examples of the organic peroxides include hydroperoxides such as t-butyl hydroperoxide, p-menthane hydroperoxide, and cumene hydroperoxide; dialkyl peroxides such as dicumyl peroxide, t-butyl cumyl peroxide, α,α'-bis(t-butylperoxy-m-isopropyl)benzene, di-t-butyl peroxide, 2,5-dimethyl-2,5-di(t-butylperoxy)-3-hexine and 2,5-dimethyl-2,5-di(t-butylperoxy)hexane; diacyl peroxides such as dipropionyl peroxide and benzoyl peroxide; peroxyketals such as 2,5-dimethyl-2,5-di(t-butylperoxy)-3-hexane, 2,5-dimethyl-2,5-di(t-butylperoxy)-3-hexine and 1,3-di(t-butylperoxyisopropyl)benzene; peroxyesters such as t-butylperoxyacetate, and t-butylperoxybenzoate; ketone peroxides such as peroxycarbonate including t-butyl peroxyisopropyl carbonate and di(isopropylperoxy)dicarbonate; and alkylsilyl peroxides such as t-butyltrimethylsilyl peroxide. Among them, preferable is dialkyl peroxide since the hindrance against the metathesis polymerization is lower.

Examples of the diazo compounds include 4,4'-bisazidobenzal(4-methyl)cyclohexanone, 4,4'-diazidochalcone, 2,6-bis(4'-azidobenzal)cyclohexanone, 2,6-bis(4'-azidobenzal)-4-methylcyclohexanone, 4,4'-diazidophenylsulfon, 4,4'-diazidodiphenylmethane and 2,2'-diazidostilbene.

The amount of the crosslinking agent used is usually in the range of 0.1 to 10 parts by weight and preferably 0.5 to 5 parts by weight relative to 100 parts by weight of all cycloolefin monomers. When the amount of the crosslinking agent is too small, crosslinking may be insufficient and the crosslinked molded product with a high crosslinking density may not be obtained. To the contrary, when the amount of the crosslinking agent is too large, the crosslinking effect is saturated and it may not be obtained the thermoplastic resin and the crosslinked resin with a desired physical properties, (Radical Crosslinking Retarder)

In this invention, when the radical generating agent is used as the crosslinking agent, it is Preferable chat the polymerizable composition contains a radical crosslinking retarder. The radical crosslinking retarder is generally a compound having a radical capturing function and has an effect of retarding the radical crosslinking reaction caused by the radical generating agent. By adding the radical crosslinking retarder into the polymerizable composition, it is possible to improve fluidity and storage stability of the thermoplastic resin when the thermoplastic resin is laminated to obtain a resin molded product.

Examples of the radical crosslinking retarder include hydroxyanisoles such as 3-t-butyl-4-hydroxyanisole, 2-t-butyl-4-hydroxyanisole, 3,5-di-t-butyl-4-hydroxyanisole, 2,5-di-t-butyl-4-hydroxyanisole, and bis-1,2-(3,5-di-t-butyl-4-hydroxyphenoxy)ethane; dialkoxyphenols such as 2,6-dimethoxy-4-methylphenol and 2,4-dimethoxy-6-t-butylphenol; catechols such as catechol, 4-t-butylcatechol and 3,5-di-t-butylcatechol; and benzoquinones such as benzoquinone, naphthoquinone and methylbenzoquinone. Among them, preferable are hydroxyanisoles, catechols and benzoquinones and especially preferable are hydroxyanisoles.

The amount of the radical crosslinking retarder used is usually in the range of 0.001 to 1 mol and preferably 0.01 to 1 mol relative to one mole of the radical generating agent.

(Polymerization Reaction Retarder)

The polymerizable composition of this Invention may contain a polymerization reaction retarder. The pot life of the polymerizable composition car be extended by the polymerization reaction retarder, Examples of the polymerization reaction retarder include acyclic 1,5-diene compounds such as 1,5-hexadiene, 2,5-dimethyl-1,5-hexadiene, (cis,cis)-2,6-octadiene and (cis,trans)-2,6-octadiene, (trans,trans)-2,6-octadiene; acyclic 1,3,5-triene compounds such as (trans)-1,3,5-hexatriene, (cis)-1,3,5-hexatriene, (trans)-2,5-dimethyl-1,3,5-hexatriene and (cis)-2,5-dimethyl-1,3,5-hexatriene; phosphines such as triphenylphosphine, tri-n-butylphosphine and methyldiphenylphosphine; and Lewis bases such as aniline.

Besides, a cycloolefin having a 1,5-diene structure or a 1,3,5-triene structure can be used as the polymerization reaction retarder. Examples thereof include monocyclic compounds such as 1,5-cyclooctadiene, 1,5-dimethyl-1,5-cyclooactadiene, 1,3,5-cycloheptatriene, (cis, trans, trans)-1,5,9-cylododecatriene, 4-vinylcyclohexene and dipentene; and polycyclic compounds such as 5-vinyl-2-norbornene, 5-isopropenyl-2-norbornene and 5-(1-propenyl)-2-norbornene. These compounds act as the polymerization reaction retarder at the same time as the cycloolefin monomer.

The ratio of the polymerization reaction retarder added is usually in the range of 0.001 to 5 parts by weight and preferably 0.002 to 2 parts by weight relative to 100 parts by weight of the total amount of cycloclefin monomers. When the amount of the polymerization reaction retarder is less than 0.001 part by weight, the effect of retarding the polymerization may not be exerted. To the contrary, when the amount of the polymerization reaction retarder is more than 5 parts by weight, the physical properties of the resin molded product obtained may lower because of the residual polymerization reaction retarder, and the polymerization reaction may not progress sufficiently.

(Other Additives)

The polymerizable composition of this invention may contain other additives, in addition to the above components, such as a reinforcement, a modifier, an antioxidant, a filler, a dispersant, a colorant, a light stabilizer and the like. These additives can be dissolved or dispersed into the cycloolefin monomer or the catalyst solution in advance.

Examples of the reinforcement include glass fibers, a glass cloth, a paper substrate, a glass unwoven fabric and the like. Examples of the modifier include elastomers such as natural rubber, polybutadiene, polyisoprene, styrene-butadiene copolymer (SBR), styrene-butadiene-styrene block copolymer (SBS), styrene-isoprene-styrene copolymer (SIS), ethylene-propylene-diene terpolmyer (EPDM), and ethylene-vinyl acetate copolymer (EVA), and hydrogenated products thereof. Examples of the antioxidant include various kinds of antioxidants for plastics and rubbers such as a hindered phenol type, a phosphorus type, an amine type and the like. These antioxidants may be used either alone, but preferably is used in combination of two or more kinds.

Examples of the filler include inorganic fillers such as glass powder, carbon black, silica, talc, calcium carbonate, mica, alumina, titanium dioxide, zirconia, mullite, cordierite, magnesia, clay, barium sulfate; and organic fillers such as wood powder and polyethylene powder. Conductivity and an electromagnetic wave shielding effect can be improved by using graphite powder, wood charcoal, bamboo charcoal, metal powder and the like. Specific Inductive capacity can be increased by using barium titanate, strontium titanate, lead titanate, magnesium titanate, bismuth titanate, lead zirconate or the like. Ferromagnetic property can be conferred by using ferrites such as Mn—Mg—Zn ferrite, Ni—Zn ferrite and Mn—Zn ferrite; and powder of ferromagnetic metals such as carbonyl iron, iron-silicon alloy, iron-aluminum-silicon alloy and iron-nickel alloy. Besides, the filler treated surface thereof with a silane coupling agent or the like can also be used.

Examples of the dispersant include an aluminate dispersant, a titanate dispersant, a carboxyl group or a carboxylic anhydride group-containing polymer, a surfactant and the like. The dispersant can improve the dispersibility of the flame retardant or the filler by using in combination thereof. As the colorant, a dye, a pigment or the like can be used. There are various kinds of dye available and those known widely can be appropriately used. Examples of the pigment include carbon black, graphite, chrome yellow, iron oxide yellow, titanate dioxide, zinc oxide, trilead tetraoixde, red lead, chromium oxide, Berlin blue, titanium black and the like. Examples of the light stabilizer include a benzotriazole ultraviolet absorbent, a benzophenone ultraviolet absorbent, a sulicylate ultraviolet absorbent, a cyanoacrylate ultraviolet absorbent, an oxanilide ultraviolet absorbent, a hindered amine based ultraviolet absorbent, a benzoate ultraviolet absorbent and the like.

(Preparation of Polymerizable Composition)

The method for preparing the polymerizable composition is not particularly limited, but there is, for example, a method for preparing a monomer solution containing the cycloolefin monomer and if necessary other additives and a catalyst solution separately, and mixing these solutions right before the reaction. When the chain transfer agent, the crosslinking agent, the radical crosslinking retarder, the polymerization reaction retarder or the other additives is used, these may be added into the monomer solution, the catalyst solution, or the mixture of the monomer solution and the catalyst solution.

[Resin Molded Product]

A resin molded product is obtained by at least bulk polymerizing the polymerizable composition. Examples of the specific method for obtaining the resin molded product include a method of polymerizing and molding the polymerizable composition by using a supporting body such as (a) a method of coating the polymerizable composition onto a supporting body such as a film and conducting bulk polymerization by heating to a predetermined temperature, (b) a method of impregnating a supporting body such as a fiber reinforcement with the polymerizable composition and conducting bulk polymerization by heating to a predetermined temperature; and a method of polymerizing and molding the polymerizable composition by using a metal mold such as (c) a method of injecting the polymerizable composition into a cavity of a forming mold and conducting bulk polymerization by heating to a predetermined temperature.

Further, the molded product can be crosslinked after bulk polymerization, which will be described later.

According to the method (a), a resin film can be obtained as the resin molded product. Examples of the supporting body include resin substrates made of resin such as polyethylene terephthalate, polypropylene, polyethylene, polycarbonate, polyethylene naphthalate, polyallylate and nylon; and metal foils made of metal materials such as iron, stainless steel, copper, aluminum, nickel, chromium, gold and silver. Among them, preferably used is the metal foil or the resin substrate. Besides, a glass reinforced resin thin film such as a glass reinforced tetrafluoroethylene resin (PTFE resin) film can also be used as the resin substrate.

The thickness of the metal foil or the resin substrate is usually in the range of 1 to 150 µm, preferably 2 to 100 µm and more preferably 3 to 75 µm from the viewpoint of workability.

The method for coating the polymerizable composition on the surface of the supporting body is not particularly limited, but here are known methods, for example, such as a spray coating method, a dip coating method, a roll coating method, a curtain coating method, a die coating method, a slit coating method and the live. The method for heating the polymerizable composition to a predetermined temperature is non particularly limited, but there are, for example, a method for heating the supporting body placed on a heating plate, a method for heating under a pressure (heat pressing) using a press machine, a method for pressing by using a heated roller, and a method using a heating furnace.

The thickness of the resin film obtained in the above method is usually 15 mm or less, preferably 10 mm or less, and more preferably 5 mm or less.

When the metal foil is used as the supporting material and is combined with the resin film, a resin laminated metal foil can be obtained. When the chain transfer agent and the crosslinking agent are used together, a thermoplastic resin in which the resin portion is post-crosslinkable can be obtained, and this thermoplastic resin can be used as a build-up material of a printed wiring board.

According to the method (b), a fiber reinforced resin film can be obtained as the resin molded product. When the polymerizable composition containing the chain transfer agent and the crosslinking agent is used, a post-crosslinkable fiber reinforced resin film can be obtained. This can be used as a so-called prepreg.

The fiber reinforcement used is a fiber made of organic and/or in organic material, and there are known fibers, for example, such as a glass fiber, a carbon fiber, an aramid fiber, a polyethylene terephthalate fiber, a vinylon fiber, a polyester fiber, an amide fiber, a metal fiber, and a ceramic c fiber. These can be used either alone or in combination of two or more. Examples of the shape of the fiber reinforcement include a mat, a cloth and a nonwoven fabric.

The method for impregnating the fiber reinforcement with the polymerizable composition includes, for example, a method in which a predetermined amount of the polymerizable composition is poured over the fiber reinforcement such as a cloth or a mat, a protective film is if necessary laminated on the wet coated fiber reinforcement, and pressing the wet coated fiber reinforcement using a roller from the upper side. After impregnating the fiber reinforcement with the polymerization composition, the fiber reinforced resin film can be obtained by heating the polymerizable composition-impregnated fiber reinforcement (impregnated product) at the predetermined temperature and conducting bulk polymerization.

The method for heating the impregnated product is not particularly limited, but the same method as the method (a) can be adopted. The impregnated product may be placed on the support and heated in this state. Besides, the fiber reinforced resin film can be obtained by bulk polymerization according to the method (c) described below. In that case, the fiber reinforcement may be placed in the mold frame and impregnated with the polymerizable composition in advance of the polymerization.

According to the method (b) using the polymerizable composition of this invention, the fiber reinforcement is impregnated with the polymerizable-state composition which contains the monomer as the resin raw material and is 1 in viscosity; therefore, the speed of impregnation or the fiber reinforcement is faster than that of impregnation with a resin solution. Further, since the polymerizable composition contains the cycloolefin monomer with a high concentration, the fiber reinforced resin film with a high resin concentration can be obtained. Also, since the polymerizable composition of this invention does not require a large amount of the solvent therein, conventional step of removing the solvent is not necessary, and therefore the productivity of the resin molded produce is excellent and the problem associated with the residual solvent does not occur. Moreover, in this invention, since polymerization is a metathesis reaction, while crosslinking is a radical reaction, wherein both reactions are different in reaction mechanism from each other, it is possible to control the reactions so as to progress in different temperature condition; therefore, the fiber reinforced resin film excellent in storage stability can be obtained.

According to the method (c), resin molded products in various shapes can be obtained. The shape of the resin molded product is not particularly limited. For example, a film, a cylinder, a prism and other shapes can be cited.

As the forming mold used, a conventional known mold, for example, a split mold, that is, a core mold and a cavity mold can be used, and the reaction solution is injected into a gap (cavity) there between and subjected to bulk polymerization. The core mold and cavity mold are produced so as to form a gap adapted to the shape of the objective molded product. The shape, material and size of the forming mold are not particularly limited. Besides, a plate-shaped mold such as a glass plate or a metal plate and a spacer with a predetermined thickness are prepared, the polymerizable composition is injected into a space formed between two plate-shaped molds via the spacer, and thus the thermoplastic resin molded product in the shape of sheet or film can be obtained.

The charging pressure (injection pressure) at which the cavity is charged with the polymerizable composition is usually 0.01 to 10 MPa, preferably 0.02 to 5 MPa. When the charging pressure is too low, a transfer face formed on the inner periphery of the cavity tends to be not excellently transferred, while when the charging pressure is too high, the rigidity of the mold should be increased, which is not economical. The clamping pressure is usually in the range of 0.01 to 10 MPa.

In any of the above methods (a), (b) and (c), the heating temperature at which the polymerizable composition is polymerized is usually in the range of 30 to 250° C. and preferably 50 to 200° C. The polymerization time may be properly selected; the time is usually in the range of 10 seconds to 20 minutes and preferably 10 seconds to 5 minutes.

The polymerizable composition is heated at a predetermined temperature to thereby start the polymerization reaction. This polymerization reaction is an exothermic reaction and once the reaction gets started, the temperature of the reaction solution rapidly rises and reaches the peak temperature in a short time (for example, about 10 seconds to 5 minutes) when the chain transfer agent and the crosslinking agent are used together on polymerizing, not only the polymerization reaction but also the crosslinking reaction progresses if the maximum temperature during the polymerization reaction is too high, thereby the post-crosslinkable thermoplastic resin may not be obtained In order to proceed only the polymerization reaction completely without occurring the cross-linking reaction, it is required that the peak temperature during the polymerization reaction is necessary to be controlled lower than 230° C. in general, preferably, at the temperature lower than 200° C.

When the radical generating agent is used as the crosslinking agent, the peak temperature during the bulk polymerization is preferably at the temperature equal to or lower than one minute half-life temperature of the radical generating agent. Herein, the term "one minute half-life temperature" means the temperature at which a half of the original amount of the radical generating agent decomposes in one minute. For example, in the case of di-t-butyl peroxide, the temperature is 186° C. and in the case of 2,5-dimethyl-2,5-bis(t-butylperoxy)-3-hexine, the temperature is 194° C.

In order to prevent overheating caused by the heat of the polymerization reaction, the polymerization reaction retarder may be added into the polymerizable composition, thereby also enabling the reaction to progress slowly.

(Crosslinking Method of Resin Molded Product)

When the polymerizable composition containing the chain transfer agent and the crosslinking agent is used, a thermoplastic resin molded product can be obtained by bulk polymerizing thereof. The resin portion in the thermoplastic resin molded product can be crosslinked by heating the thermoplastic resin molded product. The temperature for heating and crosslinking the thermoplastic resin in the molded product is preferably higher than the peak temperature during the bulk polymerization by 20° C. or more. The temperature for heating and crosslinking the thermoplastic resin is usually in the range of 150 to 250° C. and preferably 180 to 220° C. The time for heating and crosslinking is not particularly limited, but is usually in the range of several minutes to several hours.

The method for heating and crosslinking the resin molded product is not particularly limited insofar as the resin molded product can be melted. When the resin molded product is a molded product in the shape of a film, preferably adopted is a method in which the resin molded products, plurality sheets thereof are if necessary laminated, is heated and melted by heat press. The pressure of heat press is usually in the range of 0.5 to 20 MPa and preferably 3 to 10 MPa. Examples of the heat pressing method include a method using a known press machine having a press frame for plate molding and a method using a press molding machine such as sheet mold compound (SMC) and bulk mold compound (BMC). These methods are excellent in productivity.

A composite comprising a different material and the crosslinked resin molded product can be obtained by laminating the different material and the resin molded product on heating and crosslinking the resin portion in the resin molded product. Examples of the different material include metal toils such as a cooper foil, an aluminum foil, a nickel foil, a chromium foil, a gold foil and a silver foil; substrates such as a substrate for producing a printed wiring board; and other resin films such as a conductive polymer film. When the resin molded product is manufactured by the method (a), the supporting body may be used as the different material.

When a substrate is employed as the different material, it is also preferable for manufacturing a multilayer printed wiring board. The substrate is not particularly limited in so far it is used for common printed wiring board. For example, a multilayer printed wiring board can be produced by laminating an outer layer material (single sided copper clad laminate or the like) and an inner layer material (double-sided printed wiring board or the like) via the prepreg and heating the prepreg under a pressure. A build-up multilayer printed wiring board can be produced by laminating the resin laminated metal foil and an inner layer material (double-sided printed wiring board or the like) and heating thereof under a pressure.

EXAMPLES

The present invention is explained in detail below showing examples and comparative examples, to which examples the present invention is not limited.

Example 1

(1) Metal Mold

Two chrome plated iron plates in size of 200 mm×200 mm with a 500 w heater were used. In order to form a gap (cavity) inside between two iron plates, a resin spacer (with a thickness of 4 mm) in the shape of "U" and having the same size as the iron plate was sandwiched between two iron plates, and the 4 corners thereof were clamped with a squill vice. A thermocouple for temperature adjustment was stuck on the cavity-side surface of the upper iron plate in the simple metal mold obtained, and the thermocouple is connected to a temperature adjuster of the heater to control the temperature of the metal mold.

The temperature of the metal mold was set at 70° C.

(2) Polymerizable Composition

Put into a 500 ml polyethylene bottle were 60 g of tetracyclo $[9.2.1.0^{2,10}.0^{3,8}]$tetradeca-3,5,7,12-tetraene as an aromatically condensed ring-containing cycloolefin monomer, 140 g of dicyclopentadiene (containing 10% of cyclopentadiene trimer) as other cycloolefin monomer, and 8 g of red phosphorus, 26 g of ammonium polyphosphate and 26 g of aluminum hydroxide as a flame retardant. Thereafter, 0.8 ml of toluene solution thereof benzilidene(1,3-dimesitylimiazolidin-2-ylidene)(tricyclohex ylphosphine)ruthenium dichloride with a concentration of 0.05 mol/l as a metathesis polymerization catalyst was added into the mixture while stirring to prepare a polymerizable composition.

(3) Molding and Flame Test

The polymerizable composition was poured into the above metal mold at 70° C., and the polymerization reaction progressed exothermically. The molded product was taken out from the metal mold in 3 minutes after pouring the polymerizable composition. Then, the UL94 20 mm vertical flame test was conducted to the molded product obtained, and it was confirmed that the molded product had the evaluation (V-0) of the highest flame retardance.

Comparative Example 1

The polymerizable composition was prepared in the same manner as in Example 1 with the exception that the aromatically condensed ring-containing cycloolefin monomer was not used as the cycloolefin monomer and only 200 g of dicyclopentadiene (containing 10% of cyclopentadiene trimer) was used as the other cycloolefin monomer. Then, the UL94 20 mm vertical flame test was conducted to the molded product obtained, and it was confirmed that the flaming time was 30 seconds or more in the first try and thus the molded product was evaluated as rejectable quality.

Example 2

Put into a 100 ml polyethylene bottle were 27 g of tetracyclo $[9.2.1.0^{2,10}.0^{3,8}]$tetradeca-3,5,7,12-tetraene as an aromatically condensed ring-containing cycloolefin monomer, 2.2 g of tetracyclo$[6.2.1^{3,6}.0^{2,7}]$dodec-4-ene and 0.8 g of 2-norbornene as other cycloolefin monomer, 12 g of magnesium hydroxide, 4.5 g of melamine polyphosphate and 1.5 g of red phosphorus as a flame retardant, 0.54 ml (0.51 g) of allyl methacrylate as a chain transfer agent, 0.43 ml (0.34 g) of di-t-butyl peroxide (one minute half-life temperature of 186° C.) as a radical generating agent, 0.084 g of 3,5-di-t-butylhydroxyanisole as a radical crosslinking retarder and 0.3 g of PLENACT AL-M (aluminate coupling agent, manufactured by Ajinomoto-Fine-Techno Co., Inc.) as a dispersant. Thereafter, 0.31 ml of toluene solution thereof benzilidene (1,3-dimesityliriazolidin-2-ylidene)(tricyclohex ylphosphine)ruthenium dichloride with a concentration of 0.05 mol/l (containing triphenylphosphine at a concentration of 0.25 mol/l) as a metathesis polymerization catalyst was added into the mixture while stirring to prepare a polymerizable composition Two glass cloths (cut off each in size of 200 mm×200 mm with a thickness of 0.174 mm, with a trade name 7628/AS891AW, manufactured by ASAHI-SHWEBEL CO., LTD) were placed on a glass fiber reinforced PTFE resin film (cut off in size of 300 mm×300 mm, with a thickness of 0.08 mm, with a product number 5310, manufactured by SAINT-GOBAIN KK), then the polymerizable composition was poured over the glass cloths, then another glass fiber reinforced PTFE resin film same as the above was laminated thereon, and then the laminate was press rolled to be impregnated with the polymerizable composition.

Then, the laminate was placed on a hot plate heated at 145° C. for 1 minute to polymerize the monomer. Thereafter, the glass fiber reinforced PTFE resin films adhered to the both surface of the laminate were peeled off to obtain a prepreg.

The three prepregs (cut off each in size of 87 mm×87 mm) were put into A mold frame in the shape of framed rectangle and in inner size of 90 mm×90 mm (with a thickness of 1 mm), sandwiched by using PTEE films with a thickness of 0.05 mm, and then the laminate was heat pressed under a pressure of 4.1 MPa at 200° C. for 15 minutes. Thereafter, the heat pressed laminate was cooled down while being kept under the pressure and the laminate was taken out from the press after the temperature of cooled down to 100° C. or less.

Then, the UL94 20 mm vertical flame test was conducted to the laminate obtained, and it was confirmed that the laminate had the evaluation (V-0) of the highest flame retardance.

Comparative Example 2

The laminate was prepared in the same manner as in Example 2 with the exception that the aromatically condensed ring-containing cycloolefin monomer was not used as the cycloolefin monomer and 22.5 g of tetracyclo $[6.2.1^{3,6}.0^{2,7}]$dodec-4-ene and 7.5 g of 2-norbornene as other cycloolefin were used. Then, the UL94 20 mm vertical flame test was conducted to the laminate obtained, and it was confirmed that the flaming time was 30 seconds or more in the first try and thus the laminate was evaluated as rejectable quality.

Example 3

The laminate was prepared in the same manner as in Example 2 with the exception that 12 g of tetracyclo$[9.2.1.0^{2,10}.0^{3,8}]$tetradeca-3,5,7,12-tetraene as an aromatically condensed ring-containing cycloolefin monomer and 4.5 g of 2-norbornene and 13.5 g of tetracyclo$[6.2.1^{3,6}.0^{2,7}]$dodec-4-ene as other cycloolefin were used. Then, the UL94 20 mm vertical flame test was conducted to the laminate obtained, and it was confirmed that the laminate had the evaluation (V-1) of the high flame retardance.

From the results above, in cases where the same amount of the flame retardant is used, it is found that molded product excellent in flame retardance can be obtained by using the polmerizable composition of this invention (Example 1 and Comparative Example 1, and Example 2 and Comparative Example 2). In particular, it is found that the molded product is excellent in flame retardance even if a large amount of the organic component other than the cycloolefin monomer and the flame retardant is contained. In particular, the flame retardant of the molded product is excellent when the ratio of the aromatically condensed ring-containing cycloolefin monomer is high (Examples 2 and 3).

The invention claimed is:

1. A polymerizable composition comprising:
   a cycloolefin monomer,
   a flame retardant and
   a metathesis polymerization catalyst,
   wherein a monomer having a condensed ring made of an aliphatic ring having one or more carbon-carbon double bonds and an aromatic ring is used as the cycloolefin monomer and is contained in an amount of 10 weight-% or more with respect to all of the cycloolefin monomers in the polymerizable composition.

2. The polymerizable composition according to claim 1, wherein the aromatic ring is a benzene ring, a naphthalene ring or a furan ring.

3. The polymerizable composition according to claim 1, further comprising a chain transfer agent and/or a crosslinking agent.

4. The polymerizable composition according to claim 1, wherein the flame retardant is a halogen-free flame retardant.

5. The polymerizable composition according to claim 1, wherein the monomer having a condensed ring made of an aliphatic ring having one or more carbon-carbon double bonds and an aromatic ring is an aromatically condensed ring-containing cycloolefin monomer having three unsaturated aliphatic rings.

6. The polymerizable composition according to claim 5, wherein the monomer having a condensed ring made of an aliphatic ring having one or more carbon-carbon double bonds and an aromatic ring is tetracyclo $[9.2.1.0^{2,10}.0^{3,8}]$ tetradeca-3,5,7,12-tetraene.

* * * * *